United States Patent
Coutinho Filho et al.

(10) Patent No.: US 12,458,013 B2
(45) Date of Patent: Nov. 4, 2025

(54) DEVICE FOR INTRODUCING HIGH VOLTAGE INTO A PLANT

(71) Applicants: Zasso Group AG, Zug (CH); Zasso Brasil Indústria e Comércio de Máquinas Ltda., São Paulo (BR)

(72) Inventors: Sergio de Andrade Coutinho Filho, Indaiatuba SP (BR); Marcos Pisaruk, Sao Paulo (BR); Murilo Betiol, Sao Paulo (BR); Guilherme Penna Moreira Rinzler, São Paulo (BR); Christopher Freimann, Eschweiler (DE)

(73) Assignees: Zasso Group AG, Zug (CH); Zasso Brasil Indústria e Comércio de Máquinas Ltda., Indaiatuba (BR)

( * ) Notice: Subject to any disclaimer, the term of this patent is extended or adjusted under 35 U.S.C. 154(b) by 133 days.

(21) Appl. No.: 18/568,300

(22) PCT Filed: Jun. 9, 2021

(86) PCT No.: PCT/BR2021/050249
§ 371 (c)(1),
(2) Date: Dec. 8, 2023

(87) PCT Pub. No.: WO2022/256889
PCT Pub. Date: Dec. 15, 2022

(65) Prior Publication Data
US 2024/0276972 A1 Aug. 22, 2024

(51) Int. Cl.
*A01M 21/04* (2006.01)
(52) U.S. Cl.
CPC .................. *A01M 21/046* (2013.01)

(58) Field of Classification Search
CPC ........................ A01M 21/04; A01M 21/046
See application file for complete search history.

(56) References Cited

U.S. PATENT DOCUMENTS

| 2,682,729 | A | | 7/1954 | Poynor |
| 4,094,095 | A | * | 6/1978 | Dykes ............... A01M 21/046 47/1.3 |

(Continued)

FOREIGN PATENT DOCUMENTS

| FR | 2487168 | 1/1982 |
| FR | 2497633 | 7/1982 |

(Continued)

OTHER PUBLICATIONS

International Preliminary Report on Patentability Dated Nov. 21, 2023 From the International Bureau of WIPO Re. Application No. PCT/BR2021/050249. (6 Pages).

(Continued)

*Primary Examiner* — Ebony E Evans

(57) ABSTRACT

The present invention provides relates to a device for introducing high voltage into a plant substrate, the device arranged to be carried by a moving carrier. The device comprises at least two conductive electrodes; at least one pair of insulating guides connected to the at least two conductive electrodes, insulating the electrodes from each other and at least one of them from the moving carrier; at least one connector for attaching the insulating guides into the moving carrier; conductive means for conducting energy from an electrical source to the at least two conductive electrodes.

17 Claims, 5 Drawing Sheets

(56) References Cited

U.S. PATENT DOCUMENTS

| | | | | |
|---|---|---|---|---|
| 4,177,603 | A | * 12/1979 | Dykes | A01M 21/046 47/1.3 |
| 4,257,190 | A | 3/1981 | Dykcs | |
| 4,428,150 | A | * 1/1984 | Geiersbach | A01M 21/046 47/1.3 |
| 11,937,594 | B2 | * 3/2024 | Voelkening | A01M 21/046 |
| 2018/0325091 | A1 | * 11/2018 | Kroeger | A01M 21/046 |
| 2023/0329221 | A1 | * 10/2023 | Breitenstroeter | A01M 21/046 |

FOREIGN PATENT DOCUMENTS

| | | | | |
|---|---|---|---|---|
| RU | 190883 | 7/2019 | | |
| WO | WO-2021053086 A1 | * 3/2021 | | A01M 21/046 |
| WO | WO 2022/256889 | 12/2022 | | |

OTHER PUBLICATIONS

International Search Report and the Written Opinion Dated Feb. 15, 2022 From the International Searching Authority Re. Application No. PCT/BR2021/050249. (8 Pages).

Supplementary European Search Report Dated Feb. 18, 2025 From the European Patent Office Re. Application No. 21944459.3. (4 Pages).

* cited by examiner

DEVICE FOR INTRODUCING HIGH VOLTAGE INTO A PLANT

RELATED APPLICATIONS

This application is a National Phase of PCT Patent Application No. PCT/BR2021/050249 having International filing date of Jun. 9, 2021. The contents of the above application are all incorporated by reference as if fully set forth herein in their entirety.

FIELD AND BACKGROUND OF THE INVENTION

The present invention relates to a high voltage applicator for plant desiccation, with focus on desiccation of the aerial part of the potato plants. More specifically, the invention relates to an electrical weeding desiccation applicator device for the application of electricity in plants, pulled or carried by a moving carrier (such as tractor).

In the past, it has been known to kill the above-ground growth of some root crops, for example potatoes, prior to harvesting, to facilitate the harvesting and firm the skin thereof, but past methods have had a number of drawbacks. For instance, when conventional chemicals are used to kill the above-ground growth, they can and do leave residues which might migrate to the food portion of the crop, and in any event are retained in the soil to some extent and can be assimilated by the next year's crop.

Also, if the chemicals are applied too closely to a time when it rains, they may be washed off before they can be effective for killing the above-ground growth and thus a complete wasteful repeat of the application is necessary. Another issue is that dense foliage is not easily penetrated, and the chemical treatments are often temperature dependent which means that it is not always possible to apply them at the optimum time, and therefore optimum harvesting conditions may not exist. Roto-beating—that is, actual physical destruction of the above-ground growth—also is practiced in addition to or in place of chemical application. While roto-beating avoids some of the problems inherent with chemical treatment, it is fairly energy intensive, and is not as completely successful as is the chemical treatment.

It has been previously recognized that certain perennial crops can be pruned with the application of high-voltage electricity, but not destroyed. Some known techniques, like the one of document U.S. Pat. No. 4,007,794A, proposes the application of electricity to plants. Such document is directed to a technique in which the above-ground growth of potatoes and like root crops are contacted with high voltage electricity several days prior to harvesting, the electricity desiccating the above-ground portion of the crops while not harming the tubers. A no-load voltage of about 20 kv with an energy density of about 11-15 kw/foot of width treated is effective. Low-bush blueberries, and like perennial crops, are pruned by contacting the above-ground growth thereof with electricity. Pruning, in the case of blueberries, is most effective when done approximately every other year in the case of blueberries, a no-load voltage of 10-20 kv with an energy density of about 2-3 kw/foot of width treated being effective. U.S. Pat. No. 4,007,794A, however, does not disclose any specific apparatus capable of applying electricity to plants in a secure and convenient manner.

Document AU2017366640A1 relates to a device and a method for introducing a high voltage into a substrate comprising biological material, in which an applicator module having two or more applicators with simultaneously differing polarities is used through which the metered electrical high voltage flows so as to alter the substrate. Different embodiments allow the high voltage to be controlled and introduced in a targeted manner into the substrate. However, such a device has a complex structure and cannot guarantee a small distance from the ground, ensuring minimal waste of energy flows as waste through the ground.

Document WO2015119523A1 relates to an apparatus for destroying weeds, which consists of a switch transformer, cascade assembly for the voltage multiplication, and high voltage transformer and a feedback assembly, assemblied in a whole so that input connector is attached to switch, output connector of which is attached to one input connector of the transformer's primary, whose other primary end is connected to input connector, while the output connectors of transformer's secondary are connected to input connectors of cascade assembly whose output is connected to one input connector of the high-voltage transformer's primary, whilst the cascade assembly is through feedback assembly connected to the second input connector of the high-voltage transformer's primary, whereas the connectors of the high-voltage transformer's secondary are connected to the electrodes which produce a strong electromagnetic field. The apparatus for destroying weeds can be designed as a portable apparatus, as well if the electrodes are placed onto the carrier for mounting on a hand carts, on a motocultivator, on a tractor, on truck, on a trailer or on a hauler of another moving carrier on which devices apparatus for destroying weeds is also placed and from which apparatus is, through conductors, a high voltage from output connectors on apparatus, conducted to each of plurality of electrodes mounted on the carrier. However, such a device has a complex structure and is more focused on the electronic circuit that could provide energy to the apparatus.

Therefore, although the state of the art comprises some techniques for the application of high-voltage electricity to plant substrates aiming plant desiccation, there is a need for an apparatus capable of applying high-voltage electricity to plant substrates, which has a simple and reliable construction, being able to maintain a small distance from the ground and being adaptable to irregularities in the soil relief.

SUMMARY OF THE INVENTION

The present invention provides a device for introducing high voltage into a plant, the device arranged to be carried by a moving carrier. The device comprises at least two conductive electrodes; at least one modular pair of insulating guides connected to the at least two conductive electrodes, insulating the electrodes from each other and at least one of them from the moving carrier; at least one connector for attaching the insulating guides into the moving carrier; conductive means for conducting energy from an electrical source to the at least two conductive electrodes.

BRIEF DESCRIPTION OF THE SEVERAL VIEWS OF THE DRAWINGS

The invention is explained in greater detail below on the basis of figures. Shown therein are.

DESCRIPTION OF SPECIFIC EMBODIMENTS OF THE INVENTION

The invention relates to a device for introducing high voltage into a plant substrate, the device arranged to be carried by a moving carrier. The device comprises at least two conductive electrodes; at least one modular pair of insulating guides connected to the at least two conductive electrodes, insulating the electrodes from each other and at least one of them from the moving carrier; at least one connector for attaching the insulating guides into the moving carrier; conductive means for conducting energy from an electrical source to the at least two conductive electrodes.

Figure 1:
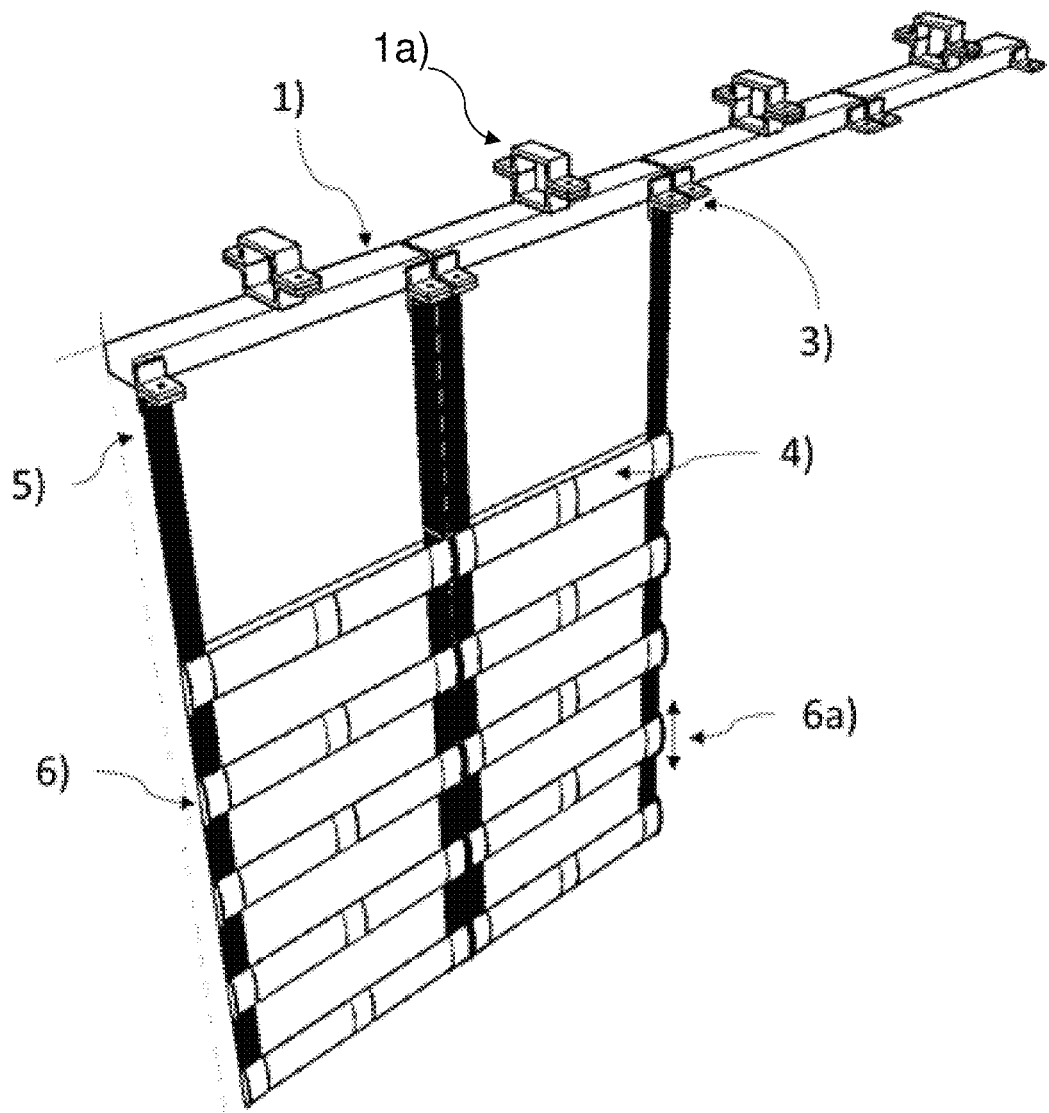
FIG. 1 shows a lower perspective view of a first embodiment of the device for introducing high voltage into a plant substrate, according to an alternative embodiment of the invention.

FIG. 1 shows a lower perspective view of a first embodiment of the device for introducing high voltage into a plant substrate, according to the invention. In FIG. 1, there are shown two pairs of insulating guides 5, each one supporting five conductive electrodes 4. However, any number of electrodes can used depending on the application, provided that at least two conductive electrodes are used. Preferably, three conductive electrodes 4 are arranged between the insulating guides.

According to the embodiment of FIG. 1, the at least one connector 1 is a metallic bar with connecting means 1a to couple in a rear part of the moving carrier. The moving carrier is preferably a tractor, motocultivator, sprayer, etc. However, the connector 1 may be configured to connect in the side parts of the moving carrier, so that the electrodes may reach a wider area, Preferably, the at least one insulating guide 5 comprises flexible insulating ropes, cables, hoses or tapes. More preferably, the insulating guides 5 are flexible insulating hoses. By being flexible, the insulating guides 5 will be in close contact with the ground due to gravity, and can be dragged from the moving carrier and adjust to the height and the soil reliefs, guaranteeing a close distance between the electrodes 4 and the ground, which is advantageous when compared to solutions of the prior art, which have a fixed structure that cannot adapt.

As can be seen in such embodiment, shields 6 are mounted on the junction between the electrodes 4 and the insulating guides 5, to avoid direct contact between the conductive electrodes 4 and the ground. Therefore, the electric power can be dissipated directly to the plants, instead of being discharged into the ground. This can also protect the electrodes 4 by avoiding direct contact with the soil.

In an alternative embodiment of the invention, the shields 6 are configured to slide 6a along the insulating guides 5 to adjust the distance between the electrodes 4. For example, two consecutive shields 6 may comprise an adjustment cable (not shown) to adjust the distance between the electrodes by adjusting the cable, similar to the operation of a blind. Such arrangement provides a connection that allows for different electrode-electrode distancing setups.

Figure 2:
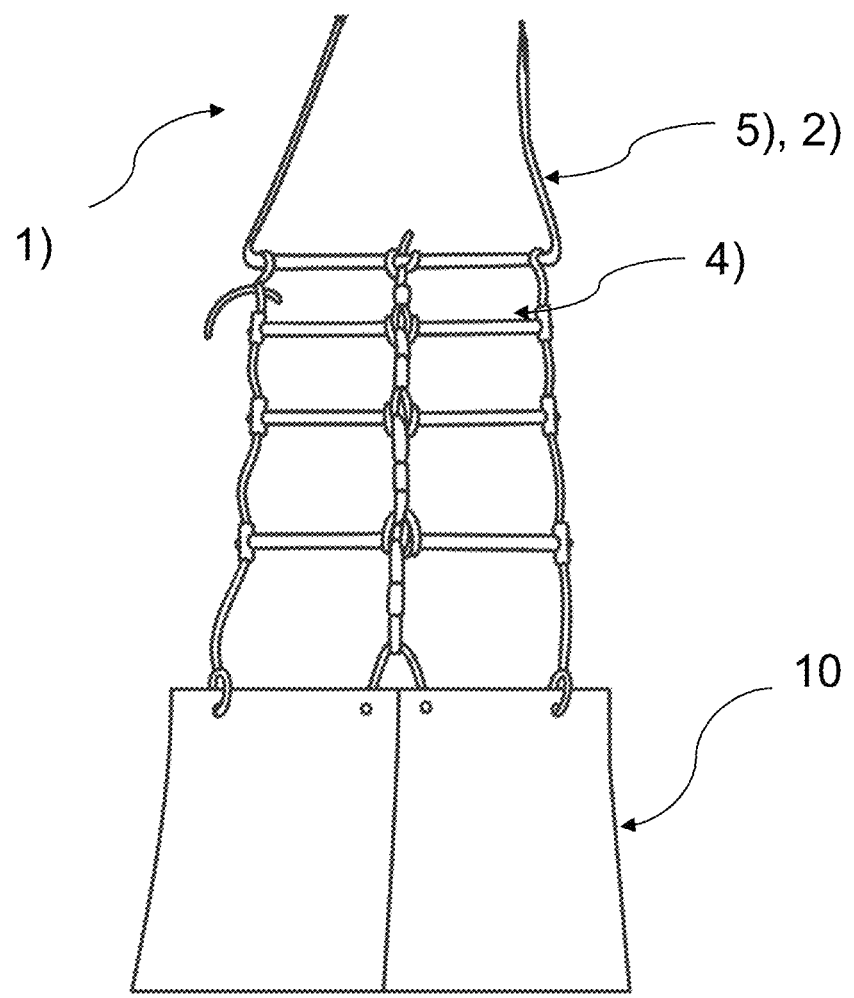
FIG. 2 shows a perspective view of the device, according to an alternative embodiment of the invention.

In a preferred embodiment, the conductive means 2 pass through the insulating guide 5 and has electrical contact with the electrodes 4 at a junction between each of the insulating guides 5 and electrodes 4. More preferably, the conductive means 2 is a conventional conductive wire, capable of conducting electrical power from a power source to the conductive electrodes 4. The power source may be positioned in the device itself or in the moving carrier. This is especially advantageous in the embodiment in which the insulating guide is a flexible hose, so that the wires can pass through the flexible hose. Such construction is considerably simple, cheap and capable of achieving the technical result of the electrical weeding proposed by the invention. FIG. 2 shows an experimental prototype of such embodiment.

According to the embodiment of FIG. 2, the at least one connector 1 for attaching the insulating guides 2 into the moving carrier is the own insulating guides 2, in the form of an insulating cord. The conductive means 2 is an insulated power cable intertwined with insulating guides 2 in the upper right portion of FIG. 2. In such configuration the device presents a simpler structure.

Figure 3:
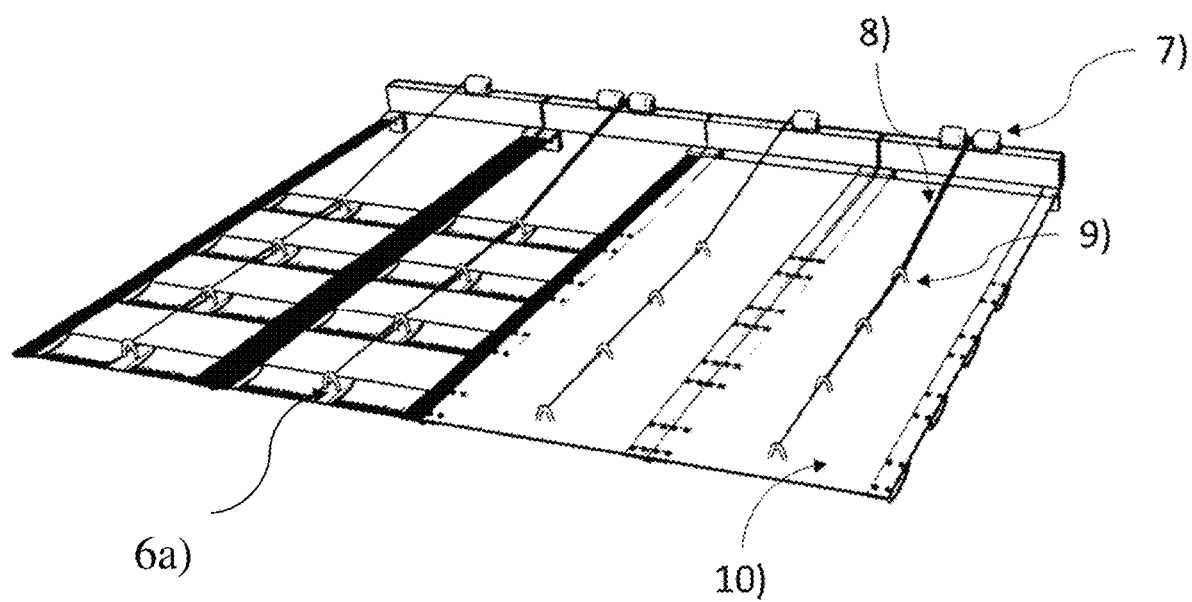
FIG. 3 shows an upper perspective view of the device, partially covered by the insulating mat.

FIG. 3 shows an upper perspective view of the device for introducing high voltage into a plant substrate according to the present invention, wherein more than two pair of insulating guides 5 can be used to accommodate more electrodes 4. Preferably, one electrode 4 of the at least two electrodes is a ground electrode.

According to the embodiment of FIG. 3, between two consecutive insulating guides 5, there is a pair of electrodes 4 separated by an intermediate insulating shield 6a, instead of each electrode being connected to the insulating guides 5. By using this arrangement, it is possible to have more electrodes 4 by using the same number of insulating guides 5, and each pair of electrodes would still be isolated from each other.

As can be seen in FIG. 3, each intermediate insulating shield 6a comprises an eyelet 9 for passing a cable 8 and, in the shield positioned farthermost from the moving carrier, the passing cable 8 is fixed in the corresponding eyelet 9. The passing cable passes through each of the eyelets 9 and is fixed in the moving carrier.

According to this alternative embodiment of FIG. 3, in order to pull the structure off, there is provided a manual or motorized winch 7 positioned at the connector 1 or in the moving carrier and connected to the passing cable 8, wherein the actuation of the winch 7 can draw the passing cable 8 in order to draw the whole device. Therefore, the device can be drawn when not in use or when the moving carrier is travelling in terrain that may damage the electrodes 4 and/or shields 6, 6a. This allows to avoid unnecessary contact with the ground, which can even increase the lifespan of the device. Retrieving the electrodes 4 when turned off with this arrangement is also advantageous since it eliminates all possible capacitive potential among the positive and negative electrodes.

Still regarding the embodiment of FIG. 3, it is provided an insulating mat 10 mounted to cover the electrodes 4 and the insulating guides 5. Although FIG. 3 shows the insulating mat 10 covering only a pair of insulating guides 5 for illustrative purposes, the mat may cover all the electrodes.

Alternately, the mat may extend after the last electrode which is farthest from the moving carrier, as shown in the embodiment of FIG. 2.

Figure 4:
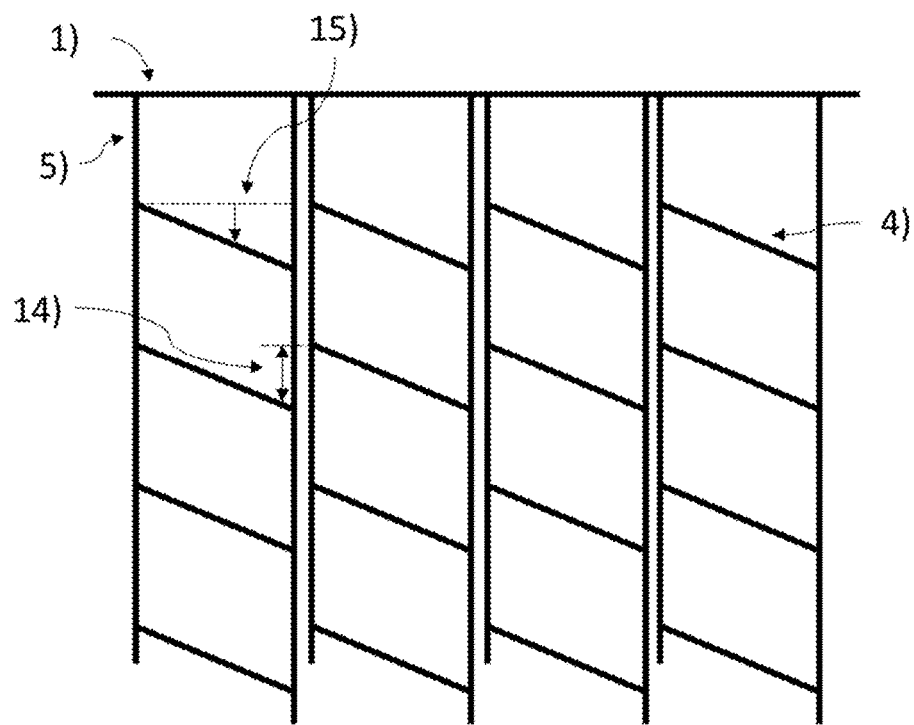
FIG. 4 shows an upper view of the device for introducing high voltage into a plant substrate, according to an alternative embodiment of the invention wherein the electrodes are inclined in relation to the insulating guides.

Alternatively, according to an alternative embodiment shown in FIG. 4, the conductive electrodes 4 are arranged at an angle in relation to the insulating guides 5, to extend the contact time with preferably large plants. Preferably, such angle varies about 45°, but can be anywhere from slightly more than 0° to about 90°.

Figure 5:
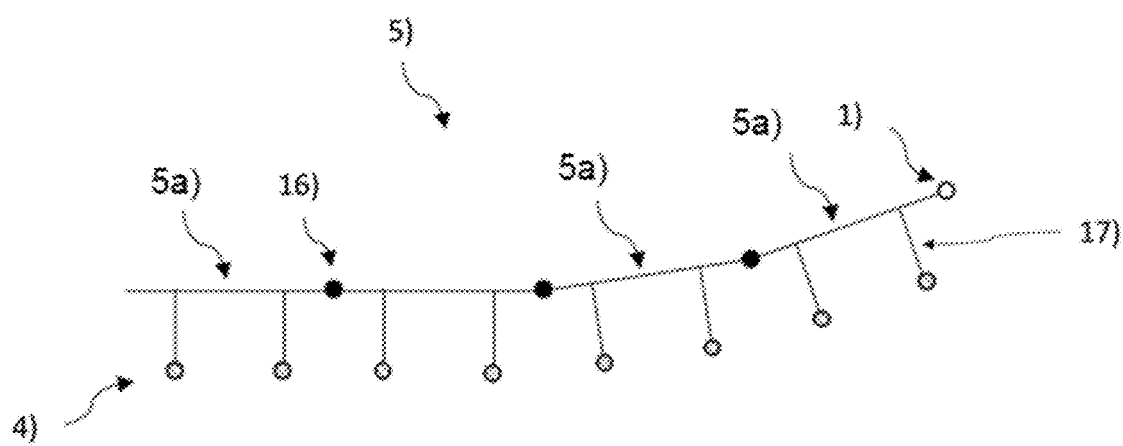
FIG. 5 shows a side view of the device for introducing high voltage into a plant according to an alternative embodiment of the invention

FIG. 5 shows a side view of the device for introducing high voltage into a plant according to an alternative embodiment of the invention. According to FIG. 5, the insulating guides 5 have a rigid shape, being composed of U-shaped or rectangular joints 5a coupled among themselves by couplers 16. The connection between the rectangular joints 5a and couplers 16 can be straight or inclined, or both, as can be seen in FIG. 5. The couplers 16 can be any type of coupling that allows one degree of freedom, so that the rectangular joints 5a can extend from the support 1 and be dragged by the moving carrier while adjusting to the ground. Alternatively, the couplers 16 may not have any degree of freedom, so that the insulating guides 5 are completely rigid.

Each of the rectangular joints 5a has an electrode 4 arranged in each of its perpendicular ends 17. Two electrodes 4 are connected to each other with a U-shaped or rectangular joints 5a, with two pairs of electrodes 4 arranged movably behind each other. Such configuration increases structural creepage distances between two electrodes 4 and thus reduce arcing and power losses.

According to the preferred embodiment of the invention, the conductive electrodes have cross section of oblong shape. However, other formats may be used, such as cylindrical format.

According to an alternative embodiment of the invention, the device may comprise a control device including a voltage sensor (not shown), wherein the control device switches the power off the electrodes 4 when they are contacting or too close to each other. Such device is advantageous to prevent the electrodes to be energized when the device is not fully extent, which may cause short circuits.

Figure 6:
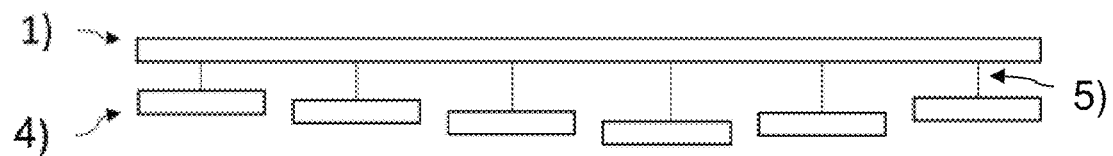
FIG. 6 shows an upper view of the device for introducing high voltage into a plant according to an alternative embodiment of the invention, configured to move the electrode back and forth.

FIG. 6 shows an upper view of the device for introducing high voltage into a plant according to an alternative embodiment of the invention. According to FIG. 6, the insulating guides 5 may have different lengths, so that the distance from the electrodes 4 to the connector 1 attached to the moving carrier can be varied along the connector 1.

Alternatively, the apparatus may comprise means to move the insulating guides 5 and the electrodes 4 back and forth, changing their relative speed against the targeted weed. A lower relative speed is shown to increase the efficacy of the treatment, since the contact resistance between the electrode 4 and the plant is momentarily reduced, and considerably more energy can be introduced into the ground.

According to an alternative embodiment of the invention, the device comprises a vibration mechanism (not shown) that causes the electrodes 4 to vibrate in the direction of travel so that the relative speed between the electrodes and the ground is temporarily below and temporarily above the moving carrier's travel speed. As a result. Such mechanism may be a vibrating motor positioned over each or at least some of the electrodes, in order to cause vibration.

The power consumption of the substrate is highly dependent on the relative velocity between the electrode and the ground. At higher speeds, the electrical frictional resistance increases sharply. By "vibrating" electrodes, it is possible to minimize the frictional resistance (in which the relative velocity is temporarily zero or very small) and greatly increase the power output into the ground. Thus, it is possible could achieve a power output that is independent of the driving speed of the vehicle.

Figure 7:
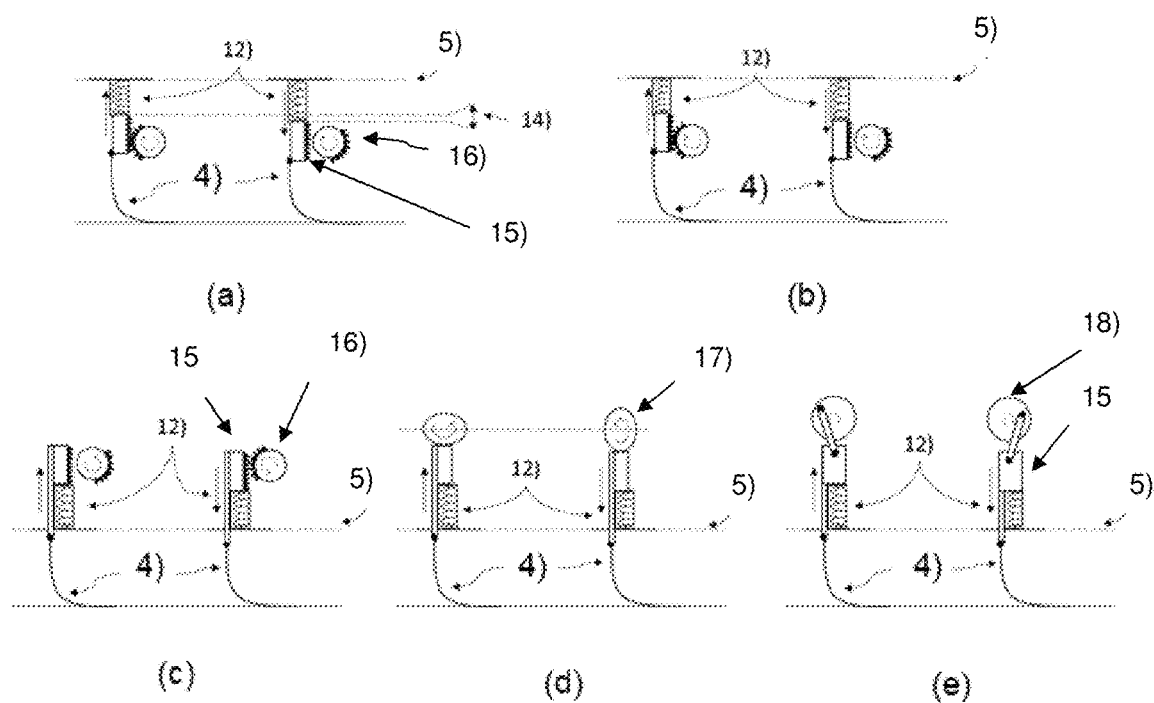
FIGS. 7 (a)-7 (e) show side views of a mechanism responsible for moving a flexible electrode 4 up and down, according to an alternative embodiment of the invention.

FIG. 7 shows another alternative embodiment of the invention, wherein the electrode 4 are flexible, so that they can bent when in contact with the ground. During the movement of the moving carrier in a direction, the end of the electrode 4 bends in a direction opposite to the direction of the moving carrier. This movement of the electrode 4 reduces the relative speed between the electrode being dragged and the plants, which, as explained, increases the efficacy of the treatment, since the contact resistance between the electrode 4 and the plant is momentarily reduced.

According to the embodiment shown in FIGS. 7 (a) and 7 (b), the device comprises a mechanism responsible for moving the flexible electrode 4 up and down, so that there is a constant reduction in the relative speed between electrode and plant during the movement of the moving carrier. Such mechanism comprises a spring 12 connected to the insulating guide 5 at one end, and connected to an electrode base 15 at the other end, wherein the electrode base 15 holds the flexible electrode 4 in a position substantially perpendicular to the ground. The electrode base has a plurality of gear teeth that cooperates with the teeth of a knob 16 partially covered by the teeth around its perimeter.

During use, as shown in FIG. 7 (a), when the knob 16 rotates clockwise, part of the time the teeth of the knob 16 cooperate with the teeth of the electrode base 15. The contact between the teeth will cause the electrode base 15 to be elevated, compressing the spring 12 upwards. The compression of spring 12 will consequentially bring the electrode 4 up, causing the electrode to be less bended over the ground. When knob 16 keeps rotating, the knob 12 disconnects from the electrode base 15, releasing the spring, which will push the electrode base 15 and the electrode 4 downward. The downward movement of the electrode 4 will cause it to contact the ground, bending itself at a speed in an opposite direction of the speed of the moving carrier. As explained, movement of the electrode 4 reduces the relative speed between the electrode being dragged and the plants. Since the knob 16 will rotate at a determined pace, this rotation will cause o constant movement upward and downward of the flexible electrodes, which will constantly lower the relative speed between the electrode being dragged and the plants.

FIG. 7 (c) illustrates another alternative embodiment of the invention, similar to the embodiment of FIGS. 7 (a) and 7 (b). According to this embodiment, the same elements are used, but in a different arrangement. The spring 12 now is positioned between the insulating guide 5 and the electrode base 15, so that the spring is compressed against the insulating guide 5 when the teeth of the knob 16 cooperate with the teeth of the electrode base 15.

FIG. 7 (d) illustrates another alternative embodiment of the invention, wherein an elliptic cam (17) that moves clockwise or counter clockwise is responsible for compressing the spring 12 against the insulating guide 5.

FIG. 7 (e) illustrates another alternative embodiment of the invention, wherein an arm cam (18) that moves clockwise or counter clockwise is responsible for compressing the spring 12 against the insulating guide 5.

The embodiments of FIG. 7 (a)-(e) are also advantageous in situations when there is a low weed pressure, that s, a low plant density in the field, so there would be spaces along the track that may have not plants and the electrode would be in direct contact with the ground. In this case, the knobs 16 or cams 17 may be configured to speed up when there is no plants and slow down when there are plants, so the electrodes 4 will stay more time over the ground (and consequently, over the plants) when there are plants and less time when there are not plants.

Therefore, the present invention solves the technical problem of providing a weeding apparatus for plant desiccation, which is simple and effective, and can adjust to different plant sizes and soil reliefs. The device serves as an electrophysical alternative method for non-systemic broadleaf herbicides and other herbicides with non-systemic action and sprout inhibiting agents whose use is subject to increasing prohibitions, and as an electrophysical alternative to mechanical methods which do not produce adequate results by the nature of their function or are too expensive or energy-intensive.

While various example embodiments have been described above, it should be understood that they have been presented by way of example, and not limitation. It will be apparent to persons skilled in the relevant art(s) that various changes in form and detail can be made therein.

The invention claimed is:

1. Device for introducing high voltage into a plant, the device arranged to be carried by a moving carrier, characterized by comprising
    at least two conductive electrodes (4);
    at least one pair of insulating guides (5) connected to the at least two conductive electrodes (4), insulating the electrodes from each other and at least one of them from the moving carrier;
    at least one connector (1) for attaching the insulating guides (5) into the moving carrier;
    wherein the at least one insulating guide (5) comprises flexible insulating ropes, cables, hoses or tapes;
    conductive means (2) for conducting energy from an electrical source to the at least two conductive electrodes (4); and
    shields (6) mounted on the junction between the electrodes (4) and the insulating guides (5) to avoid direct contact between the conductive electrodes and the ground.

2. Device, according to claim 1, characterized in that the at least one connector (1) is a metallic bar with connecting means to couple in a rear part of the moving carrier.

3. Device, according to claim 1, characterized in that at least two conductive electrodes (4) comprises at least one ground electrode.

4. Device, according to claim 1, characterized in that the conductive means (2) pass through the insulating guide (5) and has electrical contact with the electrodes (4) at a junction between each of the insulating guide and electrodes.

5. Device according to claim 1, characterized by the fact that
    the shields (6) are configured to slide along the insulating guides to modify the distance between the electrodes (4).

6. Device according to claim 5, characterized by the fact that
    two consecutive shields (6) comprise an adjustment cable to adjust the distance between the electrodes (4) by adjusting the cable.

7. Device according to claim 1, characterized by the fact that
    between two consecutive insulating guides (5), there is a pair of electrodes (4) separated by an intermediate insulating shield (6a).

8. Device according to claim 7, characterized by the fact that
    wherein each intermediate insulating shield (6a) comprises an eyelet (9) for passing a cable; and
    in the intermediate insulating shield (6a) positioned farthermost from the moving carrier, there is fixed a passing cable (8), which passes through each of the eyelets (9) and is fixed in the moving carrier.

9. Device according to claim 8, characterized by further comprising
    a manual or motorized winch (7) positioned at the connector (1) or in the moving carrier and connected to the passing cable (8), wherein the winch (7) is arranged to, by actuation, draw the passing cable (8) in order to retract the whole device.

10. Device according to claim 1, characterized by further comprising
    an insulating mat (10) mounted covering the electrodes (4) and/or after the last electrode (4).

11. Device according to claim 1, characterized in that
    the conductive electrodes (4) are arranged at an angle in relation to the insulating guides (5);
    wherein the angle is of between 0° and 90°, preferably about 45°.

12. Device according to claim 1, characterized by the fact that
    the insulating guides (5) have a rigid shape, being composed of U-shaped or rectangular joints (5a) coupled among themselves by couplers (16);
    wherein each of the U-shaped or rectangular joints (5a) has an electrode (4) arranged in each of its perpendicular ends (17).

13. Device according to claim 1, characterized by further comprising
    a control device including a voltage sensor, wherein the control device switches the power off the electrodes (4) when they are contacting or too close to each other.

14. Device according to claim 1, characterized by further comprising
    a vibration mechanism that causes the electrodes to vibrate in the direction of travel so that the relative speed between the electrodes and the ground is temporarily below and temporarily above the moving carrier's travel speed.

15. Device according to claim 1, characterized by the fact that
    the insulating guides (5) have different lengths to vary the distance from the electrodes (4) to the connector (1).

16. Device according to claim 1, characterized by further comprising
    a mechanism for moving the flexible electrode (4) up and down, comprising:
    a spring (12) connected to the insulating guide (5) at one end, and connected to an electrode base (15) at the other end,
    wherein the electrode base (15) holds the flexible electrode (4) in a position perpendicular to the ground;
    the electrode base (15) has a plurality of gear teeth that cooperates with the teeth of a knob (16) partially covered by the teeth around its perimeter.

17. Device according to claim 1, characterized by further comprising
    a mechanism for moving the flexible electrode (4) up and down, comprising:

a spring (12) connected to the insulating guide (5) at one end, and connected to an electrode base (15) at the other end,
wherein the electrode base (15) holds the flexible electrode (4) in a position perpendicular to the ground;
a cam (17, 18) for compressing the spring (12) against the insulating guide (5).

* * * * *